United States Patent [19]

Kopchik

[11] 4,255,322

[45] Mar. 10, 1981

[54] BLENDS OF IMIDE POLYMERS AND VINYL CHLORIDE POLYMERS

[75] Inventor: Richard M. Kopchik, Southampton, Pa.

[73] Assignee: Rohm and Haas Company, Philadelphia, Pa.

[21] Appl. No.: 122,170

[22] Filed: Feb. 19, 1980

[51] Int. Cl.³ .............................................. C08L 39/04
[52] U.S. Cl. ...................... 260/45.75 K; 260/45.75 J; 260/45.75 V; 260/45.75 W; 525/73; 525/205
[58] Field of Search ........................ 525/205, 192, 73; 260/45.75 K, 45.75 V, 45.75 W

[56] References Cited

U.S. PATENT DOCUMENTS

| 2,723,248 | 11/1955 | Wright | 525/205 |
| 3,639,509 | 2/1972 | Andrascheck et al. | 525/205 |
| 4,051,200 | 9/1977 | Simak et al. | 525/205 |

FOREIGN PATENT DOCUMENTS 848486 5/1977 Belgium.

*Primary Examiner*—Carman J. Seccuro
*Attorney, Agent, or Firm*—Michael B. Fein

[57] ABSTRACT

Disclosed herein are blends of imide containing polymers and vinyl chloride polymers and copolymers.

11 Claims, No Drawings

BLENDS OF IMIDE POLYMERS AND VINYL CHLORIDE POLYMERS

BACKGROUND OF THE INVENTION

1. Description of the Prior Art

Kopchik has disclosed in Belgium Pat. No. 848,486 of May 18, 1977 certain novel polyglutarimides prepared by a novel process, having improved properties over any previous polyglutarimides.

Mueller, in Ser. No. 967,663 of Dec. 8, 1978, pending disclosed improving the notched Izod impact strength and Gardner VHIT impact values by blending such polyglutarimides with polycarbonate and multiple stage polymers based on butadiene or acrylates.

While Mueller's invention succeeded in impact modifying the polyglutarimides, the incompatability of polycarbonates with polyglutarimides interferes with the achievement of clear blends. Thus, clear, high impact strength polyglutarimides were not available prior to this invention.

On the other hand, clear, high impact strength vinyl chloride polymers (PVC) were available. They were made by blending any of a wide variety of impact modifiers with the PVC. However it has always been an objective to obtain impact resistant PVC having improved heat distortion temperature. It has been very difficult to achieve significant increases in heat distortion temperature of impact modified vinyl chloride polymers so as to make them competitive with other engineering plastics.

It is an object of the present invention to provide impact resistant polyglutarimides which can be made clear, if desired.

It is a further object of the present invention to provide impact resistant vinyl chloride polymers having improved heat distortion temperatures.

2. Summary of the Invention

These objects, and others as will become apparent from the following disclosure, are achieved by the present invention which comprises blending polyglutarimides and vinyl chloride polymers in a weight ratio of about 5:95 to 95:5.

DETAILED DESCRIPTION OF THE INVENTION AND THE PREFERRED EMBODIMENTS

The polyglutarimides to be used in this invention are any known in the art, but the ones produced in accordance with the aforementioned Kopchik Belgium patent are so superior to any others known to me that they are greatly preferred.

The preferred glutarimide polymers are those which have been prepared from acrylic polymers such as poly(methylmethacrylate) and copolymers thereof by reaction in an extruder reactor in accordance with the aforementioned Kopchik invention with ammonia or methyl amine so that about 1 to about 100% of the acrylic ester groups are imidized. The optimum results are obtained with degrees of imidization of about 20 to 60%. The weight average molecular weights of the glutarimide polymers are typically about 100,000 to 200,000. Such preferred glutarimide polymers contain units of the structural formula:

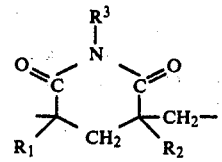

wherein $R_1$, $R_2$ and $R_3$ independently represent hydrogen or $C_1$ to $C_{20}$ unsubstituted or substituted alkyl, aryl, or mixtures thereof. Other units derived from comonomers such as styrene, methacrylic acid, vinyl acetate and other ethylenically unsaturated compounds can be present in the structure.

The vinyl chloride polymer can be polyvinyl chloride, chlorinated polyvinyl chloride, poly(vinyl chloride-vinyl acetate) or other copolymers of vinyl chloride known in the art. The preferred vinyl chloride polymer is homopolyvinyl chloride (PVC). The weight ratio of the vinyl chloride polymer to the imide polymer is generally about 5:95 to about 95:5.

Preferably, the composition further includes an "impact modifier polymer." By this term is meant the types of polymers traditionally used to impact modify PVC alone. When used, suitable amounts of impact modifier polymer comprise about 1 to 50% by weight of the blend of vinyl chloride polymer, polyglutarimide polymer, and impact modifier.

Traditional PVC impact modifiers are butadiene or acrylic based multiple stage polymers, and ethylene-vinyl acetate.

The butadiene based multiple stage polymer can be an MBS (methacrylate-butadiene styrene) type or an ABS (acrylonitrile-butadiene-styrene) type; for example, multiple stage polymers having a butadiene-styrene first stage, styrene second stage, and a methylmethacrylate-styrene final stage or an acrylonitrile-styrene final stage can be used.

An example of an acrylic based multiple stage polymer has a crosslinked butyl acrylate first stage and a methyl methacrylate final stage.

Impact modifiers having both butadiene and acrylate as comonomers in a first stage, and a second stage derived from methacrylate, styrene and the like, can be used also.

Ratios of rubber stage to hard stage can be varied from about 1:1 to about 9:1.

I have discovered, surprisingly and unexpectedly, that the vinyl chloride polymers and the glutarimide polymers are compatible. Compatibility of such polymers with such widely different chemical structure is not the usual case, and in this particular situation the fact that the two polymers are compatible means several things.

First, the DTUFL, or heat distortion temperature, of the vinyl chloride polymer can be increased by the higher DTUFL glutarimide polymers which are added.

Second, clear polymer blends are possible without having to match the refractive indices of the glutarimide polymer and the PVC polymer, which is often impossible, depending on the particular properties desired. The impact modifier polymer can be made to match the refractive index of the compatible blend of the vinyl chloride polymer and the glutarimide polymer, so that a clear ternary polymer blend can result. This compatibility is especially advantageous because it would be extremely difficult to match the refractive indices of three polymers such as the PVC, glutarimide polymer, and impact modifier polymer. This system of three components behaves as a two component system for purposes of refractive index matching.

Third, blending vinyl chloride polymer with glutarimide polymer surprisingly increases the impact modifiability of the glutarimide polymer, although Mueller achieved similar results with non-compatible polycarbonate blended with imides.

The following examples are presented to illustrate a few selected embodiments of the invention, although the invention itself is much broader and should not be considered to be limited to such examples.

EXAMPLES

In the following examples, all parts and percentages are by weight unless otherwise indicated.

EXAMPLES 1 TO 3

Polyglutarimide prepared in accordance with Kopchik Belgian Pat. No. 848,486 and having a Vicat softening point of 169° C. was used in the following experiments. First, the PVC was extruded with stabilizers and lubricants indicated in Table I in a 1 inch Killion extruder using a moderate shear screw and sequential zone temperatures of 315° F., 340° F., 345° F. and 350° F. to form pellets. Then the appropriate powder blends of the polyglutarimides and an MBS multiple stage polymer, having a butadiene based first stage polymer, were extruded in a 1 in. Killion extruder using a moderate shear screw and sequential zone temperatures of 330° F., 390° F., 390° F., and 350° F. to form product. The product was injection molded into test sample bars having the composition and properties listed in Table III. This method of making product is referred to as a pellet blend.

In Example 1, 80 parts polyglutarimide and 20 parts PVC were blended using this method. The Vicat temperature, impact strength (notched Izod) and clarity were measured, and are reported in Table III. In Example 2, 30 parts polyglutarimide, 20 parts PVC, and 50 parts of the MBS multiple stage polymer were blended using this method, the same measurements were made, and the results reported in Table III. In Example 3, 40.10 parts polyglutarimide, 25.95 parts PVC, and 33.95 parts of the MBS polymer were blended using this method, and the results of the measurements reported in Table III.

TABLE I

| Composition of the PVC Blends for Pellet Extrusion | |
|---|---|
| | Parts |
| Polyvinyl chloride, k value = 61 | 92.3 |
| Glycerol monostearate | 2.8 |
| Low molecular weight polyethylene | 0.3 |
| butyl acrylate/styrene/methyl methacrylate copolymer processing aid | 0.9 |
| di-(methyl)bis-S,S'-tin(alkyl mercaptoacetate | 3.7 |
| TOTAL | 100 |

EXAMPLE 4

The procedure of Examples 1 to 3 was followed, except using a ratio of 50% polyglutarimide, 13% PVC, and 37% MBS modifier in a 2½ in NRM extruder using a moderate compression screw and zone temperatures of 290°/350°/370°/350°/380°/370° F. Before these polymers were blended the polyvinyl chloride was stabilized as indicated in Table II.

TABLE II

| Composition of the PVC Blend for Powder Extrusion | |
|---|---|
| Polyvinyl chloride, k value = 61 | 90.5 |
| di-(methyl)bis-S,S'-bis(alkyl mercaptoacetate | 8.0 |
| glycerol monostearate | 2.5 |

The extrusion product was injection molded into test bars having the composition and properties listed in Table III. This method of making product is referred to as a powder blend.

EXAMPLE 5

The procedure of Example 4 was followed, except using a different modifier, one having a butyl acrylate, butylene diacrylate, diallyl maleate first stage (ratio 79.2/0.4/0.4) and a methyl methacrylate final stage (20 parts). The impact modifier was not matched in refractive index to the PVC/polyglutarimide blend, resulting in opaque ternary blends. The results are in Table III.

EXAMPLE 6

The procedure of Example 5 was followed except using a ratio of 25 parts polyglutarimide, 50 parts PVC, and 25 parts modifier. The results are in Table III.

EXAMPLE 7

The same polyglutarimide as described in Examples 1 and 2 is used. The polyglutarimide, polyvinyl chloride and multiple stage polymer having a partially acrylic first stage, are first mixed and then extruded in a 2½" NRM extruder with zone temperatures of 365°/375°/410°/420°/370°/360° F. into strands and then pelletized. The pellets are then injection molded into samples. The properties of these samples are given in Table III.

TABLE III

| | Composition | | | | | Notched | |
|---|---|---|---|---|---|---|---|
| Ex. No. | % Glutarimide | % PVC | % Modifier | Method of Extrusion | Vicat Temp. °C. | Izod Ft-lbs/in | Appearance |
| 1 | 80 | 20 | 0 | Pellet | 140 | 0.25 | Clear |
| 2 | 30 | 20 | 50 | Pellet | 122 | 10.2 | Clear |
| 3 | 40.10 | 29.95 | 33.95 | Pellet | 132 | 11.4 | Clear |
| 4 | 50 | 13 | 37 | Powder | 131 | 1.9 | Clear |
| 5 | 50 | 13 | 37 | Powder | 136 | 2.8 | Opaque |
| 6 | 25 | 50 | 25 | Powder | 81* | 18.0 | Opaque |

*DTUFL measurement, 264 psi, ASTM D-648

EXAMPLE 8

Example 1 was repeated except using a polyglutarimide having a glass transition temperature of about 145° C., and at varying ratios of materials as shown in Table IV.

TABLE IV

| | A | B | C | D |
|---|---|---|---|---|
| polyglutarimide Tg = 145° C. | 50 | 25 | 25 | 50 |
| PVC, K = 61 | 50 | 25 | 50 | 25 |
| Glycerol monostearate | 1 | 1 | 1 | 1 |
| Butyltin mercaptide | 2 | 2 | 2 | 2 |
| MBS polymer | 0 | 50 | 25 | 25 |
| DTUFL, 264 psi, °C. | 94 | 98 | 90 | 110 |
| Notched Izod, ft.-lb/in. | 1.1 | 10.9 | 19.5 | 6.6 |
| appearance | clear | clear | clear | clear |

EXAMPLE 9

This example shows use of PVC, polyglutarimide, impact modifiers formulations having very high PVC/glutarimide ratios, and demonstrates improvement of PVC thermal and mechanical properties using this invention.

To a formulation containing the following ingredients were added the impact modifier shown in Example 5 and a methylamine imide of polymethyl methacrylate as shown in Table V.

| | |
|---|---|
| PVC, K = 69 | 100.0 |
| tin ester heat stabilizer | 1.6 |
| Calcium-stearate internal lubricant | 1.2 |
| Polyethylene wax external lubricant | 1.2 |
| arcylate-methacrylate copolymer processing aids | 1.4 |
| $TiO_2$ UV adsorber | 14.0 |

TABLE V

| PVC Formulation | Modifier | Polyimide (Vicat, °C.) | DTUFL, °C. At 264 psi | ASTM Vicat (°C.) | Cantilever sag (inches at 90° C.) | Notched Izod (ft-lbs at 23° C.) |
|---|---|---|---|---|---|---|
| A | 90 | 10 | 0 | 71.5 | 91 | 0.93 ± 0.06 | 21.5 ± 2.4 |
| B | 80 | 10 | 10 (170) | 80.0 | 108 | 0.72 ± 0.08 | 11.2 ± 1.2 |
| C | 75 | 10 | 15 (170) | 83.0 | 105 | — | 2.9 ± 1.1 |
| D | 80 | 10 | 10 (140) | 78.5 | 96 | 0.06 ± 0.05 | 14.4 ± 0.9 |
| E | 75 | 10 | 15 (140) | 82.0 | 100 | 0.42 ± 0.05 | 13.7 ± 0.1 |
| F | 70 | 10 | 20 (140) | 86.0 | 103 | 0.19 ± 0.01 | 4.0 ± 0.1 |

I claim:

1. A compatible, impact modifiable composition comprising a blend of vinyl chloride polymer and glutarimide polymer containing units of the structural formula

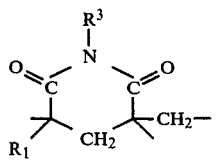

wherein $R_1$, $R_2$, and $R_3$ independently represent hydrogen or $C_1$ to $C_{20}$ unsubstituted or substituted alkyl, aryl or mixtures thereof, the weight ratio of said polymers being about 5:95 to 95:5.

2. The composition of claim 1 wherein the vinyl chloride polymer is polyvinyl chloride, chlorinated polyvinyl chloride, or poly(vinyl chloride-vinyl acetate).

3. The composition of claim 1 wherein the glutarimide polymer is a polymer consisting essentially of units of the structural formula

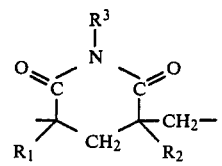

wherein $R_1$, $R_2$, and $R_3$ independently represent hydrogen or $C_1$ to $C_{20}$ unsubstituted or substituted alkyl, aryl, or mixtures thereof.

4. Composition of claim 1 wherein the glutarimide polymer is derived from a copolymer containing units derived from methyl methacrylate and one or more comonomers selected from styrene, methacrylic acid, acrylic acid, alkyl or cycloalkyl acrylates, and other methacrylates.

5. The composition of claim 1 further including an impact modifier.

6. The composition of claim 5 wherein said impact modifier is selected from the group consisting of MBS, ABS, acrylic based multiple stage, acrylate-butadiene based, and ethylene-vinyl acetate polymers.

7. The composition of claim 5 wherein said impact modifier comprises about 1 to 50% by weight of the blend of vinyl chloride polymer, glutarimide polymer, and impact modifier.

8. The composition of claim 1 further including a heat stabilizer.

9. The composition of claim 8 wherein the heat stabilizer is selected from the group consisting of organo tin compounds, organo lead compounds, and barium-cadmium compounds.

10. The composition of claim 8 containing about 1 to 10 parts heat stabilizer per 100 parts vinyl chloride polymer.

11. The composition of claim 10 wherein said heat stabilizer comprises about 4 to 8 parts per 100 parts vinyl chloride polymer.

* * * * *

UNITED STATES PATENT AND TRADEMARK OFFICE
CERTIFICATE OF CORRECTION

PATENT NO. : 4,255,322
DATED : March 10, 1981
INVENTOR(S) : Richard M. Kopchik

It is certified that error appears in the above-identified patent and that said Letters Patent are hereby corrected as shown below:

Claim 1, in the formula, insert in the lower right hand corner --$R_2$-- below "-$CH_2$-".

Signed and Sealed this

Thirtieth Day of June 1981

[SEAL]

Attest:

RENE D. TEGTMEYER

Attesting Officer     Acting Commissioner of Patents and Trademarks